United States Patent
Nemoto et al.

(10) Patent No.: US 9,328,211 B2
(45) Date of Patent: May 3, 2016

(54) POROUS CELLULOSE BODY AND METHOD FOR PRODUCING SAME

(71) Applicants: Hokuetsu Kishu Paper Co., Ltd., Niigata (JP); The University of Tokyo, Tokyo (JP)

(72) Inventors: Junji Nemoto, Niigata (JP); Toshihiko Soyama, Niigata (JP); Akira Isogai, Tokyo (JP); Tsuguyuki Saito, Tokyo (JP)

(73) Assignees: HOKUETSU KISHU PAPER CO., LTD., Niigata (JP); THE UNIVERSITY OF TOKYO, Tokyo (JP)

( * ) Notice: Subject to any disclaimer, the term of this patent is extended or adjusted under 35 U.S.C. 154(b) by 3 days.

(21) Appl. No.: 14/403,541

(22) PCT Filed: May 15, 2013

(86) PCT No.: PCT/JP2013/063557
§ 371 (c)(1),
(2) Date: Nov. 24, 2014

(87) PCT Pub. No.: WO2013/183415
PCT Pub. Date: Dec. 12, 2013

(65) Prior Publication Data
US 2015/0093560 A1    Apr. 2, 2015

(30) Foreign Application Priority Data

Jun. 5, 2012   (JP) .................................. 2012-128193

(51) Int. Cl.
*F26B 5/06*       (2006.01)
*C08J 9/28*       (2006.01)
(Continued)

(52) U.S. Cl.
CPC . *C08J 9/28* (2013.01); *C08B 15/04* (2013.01); *D21H 11/20* (2013.01); *F26B 5/06* (2013.01); *C08J 2201/0484* (2013.01); *C08J 2301/02* (2013.01); *Y10T 428/249965* (2015.04)

(58) Field of Classification Search
CPC ............... F26B 3/00; F26B 5/00; F26B 5/06; F26B 11/00; C08J 9/28; C08J 2301/02; A61K 9/00; A61K 9/14; A61K 31/00
USPC ...................... 34/284, 287, 92; 514/394, 415; 428/219, 311.71; 424/400, 401
See application file for complete search history.

(56) References Cited

U.S. PATENT DOCUMENTS 4,598,111 A * 7/1986 Wright ..................... C09D 5/38
                                                    524/37
4,780,321 A * 10/1988 Levy .................... A61K 9/5036
                                                    264/4.32

(Continued)

FOREIGN PATENT DOCUMENTS

JP    2004-204380    7/2004
JP      200382535   10/2004

(Continued)

OTHER PUBLICATIONS

International Search Report dated Aug. 6, 2013 corresponding to International Patent Application No. PCT/JP2013/063557; 4 pages.

(Continued)

*Primary Examiner* — Stephen M Gravini
(74) *Attorney, Agent, or Firm* — Ohlandt, Greeley, Ruggiero & Perle, LLP (57) ABSTRACT

A porous body that contains cellulose nanofibers having very thin fiber diameters and high hydrophilicity, and has a large specific surface area, and to provide a method of producing the porous body simply with low cost. A method of producing a porous cellulose comprises a process of lyophilizing a mixed liquid containing cellulose nanofibers and a dispersion medium, wherein the dispersion medium is a mixed dispersion medium of water and an organic solvent dissolving in water, a concentration of the organic solvent in the mixed dispersion medium is 2 to 40 mass %, and a solid content concentration of the cellulose nanofibers in the mixed liquid is 0.001 to 5 mass %.

17 Claims, 1 Drawing Sheet

(51) Int. Cl.
*C08B 15/04* (2006.01)
*D21H 11/20* (2006.01)

(56) References Cited

U.S. PATENT DOCUMENTS

| | | | | |
|---|---|---|---|---|
| 5,019,400 | A * | 5/1991 | Gombotz | A61K 9/1694 264/13 |
| 5,522,155 | A * | 6/1996 | Jones | B65D 51/1616 34/286 |
| 5,727,333 | A * | 3/1998 | Folan | F26B 5/065 34/285 |
| 6,199,297 | B1 * | 3/2001 | Wisniewski | B65D 51/241 206/439 |
| 6,223,455 | B1 * | 5/2001 | Chickering, III | B01J 2/04 34/578 |
| 6,962,006 | B2 * | 11/2005 | Chickering, III | A61K 9/1647 159/48.1 |
| 7,603,793 | B2 * | 10/2009 | Hoshino | C04B 35/565 264/148 |
| 8,769,841 | B2 * | 7/2014 | Gruber | A61K 9/19 34/287 |
| 8,793,895 | B2 * | 8/2014 | Gasteyer, III | F26B 5/06 34/287 |
| 9,170,049 | B2 * | 10/2015 | Fissore | F26B 5/06 |
| 9,192,577 | B2 * | 11/2015 | Vandecruys | A61K 9/1075 |
| 2005/0139144 | A1 * | 6/2005 | Muller | A61K 9/146 117/2 |
| 2008/0102132 | A2 * | 5/2008 | Giner | B01J 13/18 424/490 |
| 2015/0093560 | A1 * | 4/2015 | Nemoto | C08B 15/04 428/219 |

FOREIGN PATENT DOCUMENTS

| | | | |
|---|---|---|---|
| JP | 2008-01728 | 7/2009 | |
| JP | 2010215872 | 9/2010 | |
| JP | 20090057552 | 9/2010 | |
| JP | 2012-001626 | 1/2012 | |
| JP | 2012-081533 | 4/2012 | |
| JP | WO 2013183415 A1 * | 12/2013 | C08B 15/04 |
| JP | KR 20150005947 A * | 1/2015 | C08B 15/04 |
| JP | EP 2857583 A1 * | 4/2015 | C08B 15/04 |
| SE | WO 2012146625 A1 * | 11/2012 | A61K 47/10 |
| SE | KR 20140041497 A * | 4/2014 | A61K 47/10 |

OTHER PUBLICATIONS

Shibata, et al., "Nitroxide-mediated oxidation of cellulose using TEMPO derivatives: HPSEC and NMR analyses of the oxidized products", Apr. 8, 2003; 7 pages.

International Preliminary Report on Patentability dated Dec. 18, 2014 corresponding to International Patent Application No. PCT/JP2013/063557; 6 pages.

* cited by examiner

POROUS CELLULOSE BODY AND METHOD FOR PRODUCING SAME

TECHNICAL FIELD

The present invention relates to a porous body that contains cellulose nanofibers and a method for producing the same.

BACKGROUND ART

A porous cellulose body, which is also called aerogel, has low density and high specific surface area and is derived from natural products existing in a large quantity, and thus draws attention. A porous body consisting of organic matters generally has higher strength than that of a porous body consisting of inorganic materials at the same density in many oases. A porous body having high specific surface area is excellent in adsorbability, and can be a carbon-based porous body with carbonization by heating. In the middle of such technical trends, the present inventors have investigated utilization of cellulose nanofibers having a number average fiber diameter of 1 to 1000 nm.

The cellulose nanofiber in the specification, refers to (1) a fine cellulose nanofiber (cellulose fiber) or (2) a chemically-processed (modified) fine cellulose nanofiber having a number average fiber diameter of 1 to 1000 nm. The cellulose nanofiber of (1) is, for example, microfibrillated cellulose (hereinafter, abbreviated as MFC) that is fibrillated by shearing cellulose fibers under high pressure, or fine bacterial cellulose (hereinafter, abbreviated as BC) produced by a microorganism. The modified cellulose nanofiber of (2) is, for example, cellulose nanowhisker (hereinafter, abbreviated as CNW) obtained by treating natural cellulose with 40% or more of concentrated sulfuric acid, or ultra-superfine and fine cellulose fibers having a uniform fiber diameter isolated as water dispersion with moderate chemical processing and slight machine treatment of microfibril, which is a minimum unit of a fiber constituting wood pulp, under ordinary temperature and ordinary pressure (for example, see Patent Literature 1).

A cellulose nanofiber is derived from a plant or an organism, and thus has a merit of low burden to the environment at the time of production and disposal compared to a nanofiber consisting of thermoplastic polymers derived from petroleum. Accordingly, it is expected that a porous body is formed using the cellulose nanofiber, and applied to various fields and uses such as a functional filter, an electronic device material, a recycled medical material, and further a carbon material.

However, a dried body of cellulose nanofibers obtained by drying a water dispersion of the cellulose nanofibers becomes a material having low fluid permeability and high density due to the cohesive force of the cellulose nanofibers working at the time or the drying. Particularly, a portion or the whole of the C6-position hydroxyl groups of the cellulose molecules on the fiber surface of the cellulose nanofibers having a number average fiber diameter of several nm described in Patent Literature 1, is substituted with a carboxyl group, which is more hydrophilic than a hydroxyl group. In addition, the surface free energy per unit mass generally increases as much as the fiber diameter is finer, and thus the cohesive force between the fibers, which stabilizes the surface at the time of the drying, increases. Accordingly, when the water dispersion of the cellulose nanofibers described in Patent Literature 1 is dried as it is, the water dispersion aggregates due to the hydrophilicity derived from the hydroxyl groups and the carboxyl groups of the cellulose and the strong surface tension possessed by water, and becomes a non-porous gas-barrier film (for example, see Patent Literature 2).

As a method of obtaining a porous cellulose body, disclosed is a method in which a water slurry containing minute cellulose fibers having an average fiber diameter of 2 to 1000 nm in 0.1 to 3.5 mass % of the solid content concentration is lyophilized, whereby to obtain a porous body having high surface area which has porosity and continuous foaming (for example, see Patent Literature 3).

As a method for preventing aggregation at the time of drying cellulose fine fibers (microfibrils), known are a method in which a water dispersion containing cellulose fine fibers is sprayed onto a cooled metal plate and rapidly frozen, and then sublimated to manufacture a porous body of the cellulose fine fibers, and a method in which the dispersion medium is substituted with ethanol and subsequently t-butyl alcohol, and then the dispersion is lyophilized whereby to manufacture a porous body of the cellulose fine fibers (for example, see Patent Literature 4).

As a method of obtaining a porous cellulose body (aerogel), known is a method in which water that is the dispersion medium in a physical gel of cellulose nanofibers is substituted with moisture ethanol, ethanol or t-butyl alcohol, and then the dispersion is lyophilized (for example, see Patent Literature 5).

CITATION LIST

Patent Literature

Patent Literature 1: JP 2008-1728 A
Patent Literature 2: JP 2009-57552 A
Patent Literature 3: JP 2010-215872 A
Patent Literature 4: JP 2003-82535 A
Patent Literature 5: JP 2012-1626 A

Non Patent Literature

Non Patent Literature 1: I. Shibata and A. Isogai, "Cellulose" Vol. 10 (2003), p. 335-341

SUMMARY OF INVENTION

Technical Problem

In Patent Literature 3, a porous body having high surface area, is obtained using lyophilization, but it is considered that water crystal (ice crystal) is generated at the time of the freezing since water is used as the dispersion medium. If the ice crystal is generated, the cellulose nanofibers are concentrated around the ice crystal, and the surface area of the porous body decreases. The literature has no description for a method of suppressing the ice crystal, and thus, it has to be judged that it is difficult to obtain a porous body having acre than 100 $m^2/g$ of the specific surface area although the value of the surface area is not described in the literature.

Although the lyophilization is also used in Patent Literature 4, in this method, the specific surface area of the cellulose fine fiber is 65.2 $m^2/g$ at most in the case where water is used as the dispersion medium, and thus the specific surface area as the porous body is small. On the other hand, in the case where the dispersion medium is substituted with t-butyl alcohol, the specific surface area of the cellulose fine fiber is 118 $m^2/g$ at most, but, in this method, the problem is that operations of once substituting the dispersion medium with ethanol, and then substituting the dispersion medium with t-butyl alcohol are necessary, and the operation of substituting the dispersion medium becomes more complicated.

In Patent Literature 5, it is estimated that a porous cellulose body having a specific surface area over 600 m²/g is obtained in theory, but, in Examples, 9 times of solvent-substitution process of the cellulose nanofiber physical gel are necessary, and the production cost is enormous, and thus, there is a problem that utilization in the industry level is difficult.

Development of at porous body that can be produced with a further simple method is desired in the field of utilizing cellulose nanofibers from a viewpoint of expanding application and development of the cellulose nanofibers. However, as described above, there is no method, that allows production of the porous body with a simple method using cellulose nanofibers at present.

The present invention has been made in view of such problems, and an object of the present invention is to provide a porous body that contains cellulose nanofibers having very thin fiber diameters and high hydrophilicity, and has a large specific surface area, and to provide a method of producing such porous body simply with low cost.

Solution to Problem

The present inventors have repeated investigation in order to solve the problems, and as a result, have arrived at completion of the present invention. That is, according to the present invention, there is provided a method, of producing a porous cellulose body, the method comprising a process of lyophilizing a mixed liquid containing cellulose nanofibers and a dispersion medium, wherein the dispersion medium is a mixed dispersion medium of water and an organic solvent dissolving in water, the concentration of the organic solvent in the mixed dispersion medium is 2 to 40 mass %, and the solid content concentration of the cellulose nanofibers in the mixed liquid is 0.001 to 5 mass %.

In the method of producing a porous cellulose body according to the present invention, it is preferable that preparation of the mixed liquid is performed, by preparing an aqueous dispersion of the cellulose nanofibers in which the cellulose nanofibers are dispersed in water, and then adding the organic solvent to the aqueous dispersion of the cellulose nanofibers. It is possible to make dispersion of the cellulose nanofibers uniform.

In the method of producing a porous cellulose body according to the present invention, it is preferable that the number average fiber diameter of the cellulose nanofibers is 1 to 100 nm. It is possible to obtain a porous body having a large specific surface area.

In the method of producing a porous cellulose body according to the present invention, it is preferable that the organic solvent contains at least one kind of alcohols, carboxylic acids or carbonyl compounds. It is possible to further reduce the crystal (ice crystal) produced at the time of water freezing, and to obtain a porous body having a further large specific surface area.

In the method of producing a porous cellulose body according to the present invention, it is preferable that the organic solvent contains at least one kind of (1) to (6) of (1) methanol, (2) ethanol, (3) 2-propanol or (4) t-butyl alcohol as the alcohols, (5) acetic acid, as the carboxylic acids and (6) acetone as the carbonyl compounds. It is possible to obtain a mixed solvent that is excellent in compatibility with water, and is further uniform.

In the method of producing a porous cellulose body according to the present invention, it is preferable that the organic solvent is t-butyl alcohol alone. The freezing point of the mixed solvent with water does not remarkably decrease and thus the freezing is easy.

According to the present invention, there is provided a porous cellulose body obtained with the method of producing a porous cellulose body according to the method of producing a porous cellulose body according to the present invention, wherein the specific surface area by a nitrogen adsorption BET method is 70 m²/g or more.

According to the present invention, it is preferable that the porous cellulose body is attached to the surface, or the surface and the inside of a porous support. Since the mixed, liquid is in liquid form, it is possible to attach the mixed liquid uniformly to the porous support.

Advantageous Effects of Invention

According to the present invention, it is possible to provide a porous cellulose body that contains cellulose nanofibers having very thin fiber diameters, and high hydrophilicity. In addition, according to the present invention, it is possible to provide a method of producing a porous cellulose body simply with low cost. Furthermore, according to the present invention, it is possible to reduce the crystal generated at the time of freezing the solvent, and thus it is possible to provide a porous body having a large specific surface area.

DESCRIPTION OF EMBODIMENTS

Next, the present invention will be described specifically with embodiments, but the present invention should not be interpreted to be limited to these descriptions. The embodiments may be variously modified as long as they take effects of the present invention.

The method of producing a porous cellulose body pertinent to the present embodiment is a method of producing a porous cellulose body, which includes a process of lyophilizing a mixed liquid containing cellulose nanofibers and a dispersion medium, wherein the dispersion medium is a mixed dispersion medium of water and an organic solvent dissolving in water, the concentration of the organic solvent in the mixed dispersion medium, is 2 to 40 mass %, and the solid, content concentration of the cellulose nanofibers in the mixed liquid is 0.001 to 5 mass %.

<Cellulose Nanofiber>

In the present embodiment, the cellulose nanofiber includes chemically-processed, (modified) cellulose nanofibers. In the cellulose nanofiber, the molecular chains of the cellulose form two or more bundles. Formation of two or more bundles of the molecular chains of the cellulose refers to the state in which two or more molecular chains of the cellulose are assembled to form an assembly called the microfibril. In the present embodiment, the molecular chain of the cellulose includes forms substituted with other functional groups, for example, those in which a portion or the whole of C6 position hydroxyl groups in the molecule is oxidized to an aldehyde group, a carboxyl group and the like, those in which a portion or the whole of the hydroxyl groups including hydroxyl groups at positions other than C6 position is esterified to a nitric acid ester, an acetic acid, ester and the like, and those etherified to methyl ether, hydroxypropyl ether, carboxymethyl ether and the like.

The number average fiber diameter of the cellulose nanofibers is not particularly limited, but is preferably 1 to 100 nm. The diameter is more preferably 2 to 50 nm, and particularly preferably 2 to 10 nm. By using the cellulose nanofibers having a number average fiber diameter of 1 to 100 nm, a porous body having a large specific surface area is easily obtained. If the diameter is less than 1 nm, the strength of the single fiber of the nanofiber is weak, and the structure of the porous body may be difficult to maintain. If the diameter is over 100 nm, the specific surface area may be insufficient as the porous body. Herein, the number average fiber diameter is calculated in accordance with the following. For a cellulose nanofiber cast on a carbon membrane-coated grid, observation is performed by an electron microscope image using a transmission electron microscope (TEM). With respect to the obtained observation image, two random axes are drawn vertically and horizontally per one image, and the fiber diameter of the fiber intersecting the axis is read by sight. At this time, the observation is performed at any magnification of 5000 folds, 10000 folds or 50000 folds depending on the size of constituting fibers. Meanwhile, the sample or the magnification makes it a condition that 20 or more of the fibers intersect the axis. In this way, minimum 3 images of the surface portions not overlapping are photographed with an electron microscope, and the value of the fiber diameter of the fiber intersecting the two axes is read, respectively. Accordingly, minimum 120 (=20×2×3) pieces of fiber information are obtained. The number average fiber diameter is calculated from the data of the obtained fiber diameters. Meanwhile, with respect to a branching fiber, the branching portion is incorporated into calculation of the fiber diameter as one fiber if the length of the branching portion is 50 nm or more.

In addition, the number average fiber length of the cellulose nanofibers is not particularly limited, but is preferably 0.01 to 20 μm. The length is more preferably 0.05 to 10 μm. If the number average fiber length is less than 0.01 μm, the nanofiber may become close to a particle, and the entanglement of the porous body may become weak. If the number average fiber length is over 20 μm, the entanglement of the nanofibers may increase, and the fluidity of the liquid when dispersed in a solvent may decrease. Meanwhile, the number average fiber length is calculated by observing those obtained by thinly casting a dispersion liquid of the cellulose nanofibers on a substrate and lyophilizing the dispersion liquid from an electron microscope image using a scanning electron microscope (SEM). With respect to the obtained observation image, 10 independent fibers per one image are randomly selected, and the fiber length thereof is read by sight. At this time, the observation is performed at any magnification of 5000 folds or 10000 folds depending on the length of the constituting fibers. Meanwhile, the subject for the sample or the magnification is fibers of which the starting point and the ending point are in the same image. In this way, minimum 12 images of the surface portions not overlapping are photographed with SEM, and the fiber length is read. Accordingly, minimum 120 (=10×12) pieces of fiber information are obtained. The number average fiber length can be calculated from the data of the obtained fiber diameters. Meanwhile, with respect to a branching fiber, the length of the longest portion of the fiber is taken as the fiber length.

The kind of the cellulose nanofiber is, for example, MFC, BC and CNW described above, and the cellulose nanofibers described in Patent Literature 1. MFC is characterized by having broad distribution of the fiber diameter since MFC is made to a nanofiber by shearing cellulose fibers by mechanical treatment. BC is characterised by having relatively uniform fiber diameter. CNW has a short fiber length of 0.1 to 0.2 μm, but is characterized, by having relatively uniform fiber diameter. The cellulose nanofiber described in Patent Literature 1 is produced as a water dispersion by oxidizing a cellulose raw material using an oxidizing agent in the presence of an N-oxyl compound, a bromide, an iodide or a mixture thereof, further subjecting the oxidized cellulose to wet micronization treatment to fibrillate the oxidized cellulose and convert the fibrillated cellulose to nanofibers, and is characterized by having uniform fiber diameter as described in Patent Literature 1. Among them, the fine cellulose described in Patent Literature 1 is particularly preferable in the points of less energy necessary for the production and high productivity in comparison to other cellulose fibers.

The cellulose nanofiber described in Patent Literature 1 is a cellulose single microfibril. A natural cellulose builds a higher-order solid structure by multi-bundle formation of microfibrils. Herein, the microfibrils are strongly aggregated to each other by hydrogen bonds derived from the hydroxyl groups in the cellulose molecule. The cellulose single microfibril refers to a microfibril obtained by subjecting a natural cellulose to chemical treatment and slight mechanical treatment, and isolating the resultant. The cellulose nanofiber described in Patent Literature 1 is as oxidized, with at least one functional group selected from a group consisting of a carboxyl group and an aldehyde group in a portion of the hydroxyl group of the cellulose molecule, and has cellulose I type crystal structure. The maximum fiber diameter is 1000 nm or less. If this cellulose nanofibers are dispersed in water, it becomes a transparent liquid.

In the present embodiment, the cellulose nanofiber is preferably the cellulose nanofiber described in Patent Literature 1 and has a number average fiber diameter of 1 to 100 nm. The number average fiber diameter is more preferably 2 to 10 nm. If the number average fiber diameter is less than 1 nm, the strength of the single fiber of the nanofiber may be weak, and the structure of the porous body may be difficult to maintain. If the diameter is over 100 nm, the specific surface area of the porous body may decrease. In addition, the number average fiber length of the cellulose nanofibers described in Patent literature 1 is not particularly limited, but preferably 0.01 to 20 μm. The length is more preferably 0.05 to 10 μm. If the number average fiber length is less than 0.01 μm, the nanofiber may become close to a particle, and the entanglement of the porous body may become weak. If the length is over 20 μm, the entanglement of the nanofibers may become too strong, and the liquid fluidity when dispersed in a solvent may decrease.

The cellulose raw material that is a raw material of the cellulose nanofibers is not particularly limited, and is, for example, various wood-derived kraft pulps such as a broad-leaved tree bleached kraft pulp (LBKP) and a needle-leaved tree bleached kraft pulp (NBKP); a sulfite pulp; waste paper pulps such as a deinked pulp (DIP); mechanical pulps such as a grand pulp (GP), a pressurizing ground wood pulp (PGW), a refiner ground wood pulp (RMP), a thermomechanical pulp (TMP), a chemithermomechanical pulp (CTMP), a chemimechanical pulp (CMP) and as chemi-grand pulp (CGP); powder type celluloses obtained by crushing them with a high pressure homogenizer, a mill and the like; and microcrystal cellulose powders obtained by purifying them with, chemical processing such as hydrolysis. In addition, plants such as kenaf, hemp, rice, bagasse, bamboo and cotton may be used. The present embodiment is not limited for the raw material of the cellulose nanofiber and the production method.

A method of producing the cellulose nanofiber is, for example, the production method described in Patent Literature 1. According to Patent Literature 1, the method of producing the cellulose nanofiber includes an oxidation reaction process of applying at co-oxidizing agent to natural cellulose as a raw material with an N-oxyl compound as an oxidation catalyst in water whereby to oxidize the natural cellulose and obtain a reactant fiber, a purification process of removing impurities whereby to obtain reactant fibers impregnated with water, and a dispersion process of dispersing the reactant fibers impregnated with water in a dispersion medium.

In the oxidation reaction process, a dispersion liquid in which natural cellulose is dispersed, in water, is prepared. The dispersion medium of the natural cellulose in the reaction is water. Then, the concentration of the natural cellulose in the reaction dispersion liquid is arbitrary if it is a concentration allowing sufficient diffusion of the reagents, and ordinarily 5 mass % or less with respect to the mass of the reaction dispersion liquid.

The N-oxyl compound that can be used, as an oxidation catalyst of cellulose is reported in large numbers. An example of the report is a report titled "Catalytic oxidation of cellulose using TEMPO derivative; HPSEC and HMR analysis of oxidation product" (for example, see don Patent Literature 1). Among the N-oxyl compound, TEMPO, 4-acetoamido-TEMPO, 4-carboxy-TEMPO or 4-phosphonooxy-TEMPO is particularly preferable in the point of fast reaction speed, at ordinary temperature in water. The addition amount of the N-oxyl compound is sufficiently a catalytic amount. Specifically, the addition amount of the N-oxyl compound with respect to the aqueous reaction solution is preferably 0.1 to 4 mmol/l, and more preferably 0.2 to 2 mmol/l. If the addition amount is less than 0.1 mmol/l, the catalytic effect may be inferior. If the addition amount is over 4 mmol/l, the N-oxyl compound, may not dissolve in water.

The co-oxidizing agent is, for example, a hypohalous acid or a salt thereof, a halogenous acid or a salt thereof, a perhalogenic acid or a salt thereof, hydrogen peroxide, or a perorganic acid. The co-oxidizing agent is preferably alkali metal hypohalous acid salt. The alkali metal hypohalous acid salt is, for example, sodium hypochlorite or sodium hypobromite. In the case where sodium hypochlorite is used, the reaction is preferably progressed in the presence of alkali metal bromide, for example, sodium bromide in terms of the reaction speed. The addition amount of this alkali metal bromide is preferably 1 to 40 folds in the molar amount with respect to the N-oxyl compound. The addition amount is more preferably 10 to 20 folds in the molar amount. If the addition amount is less than 1 fold in the molar amount, the reaction speed may be inferior. If the addition amount is over 40-fold amount mole, the reaction speed may be inferior. The pH of the aqueous reaction solution is preferably maintained in a range of 8 to 11. The temperature of the aqueous solution is arbitrary at 4 to 40° C., the reaction can be performed at room temperature, and particular control of the temperature is not necessary. The addition amount of the co-oxidizing agent is preferably in a range of 0.5 to 8 mmol with respect to 1 g of the natural cellulose. The reaction is preferably performed for 5 to 120 minutes, and is completed within 240 minutes at the longest.

The purification process is a process of purifying the oxidized cellulose slurry obtained from the oxidation reaction process by removing impurities such as unreacted hypochlorite and various side-products from the oxidized cellulose slurry. The oxidized cellulose slurry at the stage having completed the oxidation reaction process is ordinarily not dispersed in pieces to the nanofiber unit, and thus is made to purified oxidized cellulose slurry of high purity (99 mass % or more) with an ordinary purification method, specifically repetition of a water-washing process and filtering process. Thus-obtained, purified oxidized cellulose slurry is preferably in a range of 10 to 50 mass % as the solid content (cellulose) concentration in the squeezed state. The solid content (cellulose) concentration of the purified, oxidized cellulose slurry is more preferably 15 to 30 mass %. If the solid content concentration is higher than 50 mass %, very high energy is necessary for the dispersion and thus it is not preferable in consideration of the dispersion process performed later.

The dispersion process is a process of further dispersing the oxidized cellulose slurry obtained from the purification process in water to obtain a dispersion liquid of the cellulose nanofibers. As the dispersing machine, a generic dispersing machine as an industrial production machine can be used. The generic dispersing machine is, for example, a screw type mixer, a paddle mixer, a dispersion type mixer or a turbine type mixer. Further, by using a stronger apparatus having refinement performance such as a homo-mixer under high speed rotation, a high pressure homogenizer, an ultra-high pressure homogenizer, ultrasonic dispersion treatment, a beater, a dish type refiner, a conical type refiner, a double disk type refiner and a grinder, more effective and advanced downsizing becomes possible.

The solid content concentration of the oxidized cellulose slurry before the dispersion is preferably 0.01 to 0.50 mass %. The solid content concentration is more preferably 0.10 to 0.30 mass %. If the solid content concentration is over 0.50 mass %, the viscosity of the dispersion liquid of the cellulose nanofibers may increase, and thus the fluidity may decrease, and the dispersion efficiency may decrease. If the solid content concentration is less than 0.01 mass %, the ratio of water occupying in the dispersion liquid may increase extremely, and the dispersion efficiency may decrease. In the case where a dispersion liquid of the cellulose nanofibers having a high solid content concentration is needed, it can be obtained by concentrating a dispersion liquid having a low solid content concentration.

In the method of producing a porous cellulose body pertinent to the present embodiment, it is necessary to remove the dispersion medium in the mixed liquid. In the case where the dispersion medium is water alone, the crystal of water (ice crystal) is produced at the time of the freezing, the cellulose nanofibers axe concentrated around the ice crystal, and aggregation is partially generated. In the method of producing a porous cellulose body pertinent to the present embodiment, by using a mixed dispersion medium, in which an organic solvent is added in a small amount to water as the dispersion medium, it is possible to suppress growth of the ice crystal generated at the time of freezing the dispersion medium, and solidify the dispersion medium in the closely-amorphous state. Then, by sublimating the dispersion medium solidified in the closely-amorphous state, it is possible to obtain a porous cellulose body having a large specific surface area. The specific surface area by the nitrogen adsorption BET method (hereinafter, it may be referred to as the specific surface area) of the porous cellulose body pertinent to the present embodiment is preferably 70 $m^2/g$ or more, and more preferably 100 $m^2/g$ or more. If the specific surface area is less than 70 $m^2/g$, the specific surface area as the porous body may be insufficient. The upper limit value of the specific surface area of the porous cellulose body is preferably 1000 $m^2/g$, and more preferably 000 $m^2/g$. If the specific surface area is over 1000 $m^2/g$, the strength of the cellulose nanofiber may become weak, and the porous body may become fragile. With lyophilization in which the dispersion medium is completely substituted with an organic solvent, such substitution takes a long time even though the porous body is obtained. In addition, hydrophobicity of the dispersion medium may increase, and hydrophilic cellulose nanofibers may not be uniformly dispersed. In contrast to this, in the method of producing the porous body pertinent to the present embodiment, by using a mixed dispersion medium of water and an organic solvent dissolving in water, wherein the concentration or the organic solvent is 2 to 40 mass % in the mixed dispersion medium, it is possible to obtain a mixed liquid in which the cellulose nanofibers are uniformly dispersed in the dispersion medium, and further it is possible to obtain a porous cellulose body having high specific surface area with a simple method without necessarily completely substituting the dispersion medium.

<Organic Solvent>

The organic solvent in the present invention refers to an organic compound that is liquid at ordinary temperature and ordinary pressure. In addition, the dissolution in water refers that water and the organic solvent are mixed with each other at the molecule level in a range of 98:2 to 60:40 of the mixing mass ratio of water and the organic solvent, and there is no phase separation in the mixed dispersion medium in which water and the organic solvent are mixed. In the porous cellulose body pertinent to the present embodiment, water and the organic solvent, and the cellulose nanofibers are mixed to give a mixed liquid. The concentration of the organic solvent in the mixed dispersion medium is 2 to 40 mass %. The concentration is more preferably 10 to 30 mass %. If the concentration of the organic solvent is over 40 mass %, the organic solvent may become a dispersion medium having high hydrophobicity, and the cellulose nanofibers having hydrophilicity may not be uniformly dispersed in the mixed liquid. In addition, if the concentration of the organic solvent is less than 2 mass %, formation of the crystal of water (ice crystal) at the time of freezing the dispersion medium is remarkable, which ceases aggregation or structure destruction of the cellulose nanofibers, and a porous body having a large specific surface area is not obtained.

In the present embodiment, the organic solvent preferably contains at least one kind of alcohols, carboxylic acids or carbonyl compounds. By containing such organic solvent, it is possible to reduce the crystal (ice crystal) generated at the time of water freezing, and enhance the specific surface area of the porous body. In addition, the organic solvent more preferably contains at least one kind of (1) to (6) of (1) methanol, (2) ethanol, (3) 2-propanol or (4) t-butyl alcohol as alcohols, (5) acetic acid as carboxylic acids and (6) acetone as carbonyl compounds, from the viewpoint of the compatibility with water. Among them, the organic solvent is particularly preferably t-butyl alcohol alone. The complete freezing point of the mixed dispersion medium in which water and t-butyl alcohol are mixed is about −10° C. at the lowest, which is higher in comparison to that of a mixed dispersion medium of other organic solvents and water, and thus the freezing is easy. It is known that in an aqueous solution of t-butyl alcohol, water and t-butyl alcohol become eutectic crystal when the concentration of t-butyl alcohol is near 20 mass %, and the size of the crystal at the time of the freezing becomes the minimum. In the case where the organic solvent is t-butyl alcohol alone, the concentration of t-butyl alcohol in the mixed dispersion medium is preferably 15 to 30 mass %, and more preferably 20 to 25 mass %. With this range, it is possible to obtain a porous body having a specific surface area, for example, 190 $m^2/g$ or more.

Next, each process of the method of producing a porous cellulose body pertinent to the present embodiment will be described.

<Process of Preparing Mixed Liquid>

In the method of producing a porous cellulose body pertinent to the present embodiment, water and the organic solvent, and the cellulose nanofibers are mixed to give a mixed liquid. The form of the cellulose nanofibers in the mixed liquid is, for example, a form in which the cellulose nanofibers are dispersed in pieces. In order to further uniformly disperse the cellulose nanofibers, preparation of the mixed liquid is preferably performed by preparing an aqueous dispersion of the cellulose nanofibers in which the cellulose nanofibers are dispersed in water, and then adding an organic solvent to the aqueous dispersion of the cellulose nanofibers. Herein, as the aqueous dispersion of the cellulose nanofibers, the dispersion liquid of the cellulose nanofibers obtained with the dispersion process described in Patent Literature 1 may be used as it is, or the dispersion liquid may be once dried to give fine cellulose fibers, and then the fine cellulose fibers may be dispersed again in water. It is more preferable in the point of the work efficiency that the dispersion liquid of the cellulose nanofibers obtained with the dispersion process is used as it is. The dispersion liquid of the cellulose nanofibers obtained with the dispersion process is preferably used as diluted or concentrated to a desired concentration. The solid content concentration of the cellulose nanofibers in the aqueous dispersion of the cellulose nanofibers is preferably 0.001 to 5 mass %, and more preferably 0.01 to 1 mass %. A method for preparing the mixed, liquid is not particularly limited, and is, for example, a method of mixing liquids using a propeller type impeller, a method of mixing liquids by shaking a vessel containing the components of the mixed liquid using a shaker, or a method of mixing liquids using a magnetic stirrer, and a particularly strong dispersing machine is not necessary. If the aqueous dispersion of the cellulose nanofibers is added to the organic solvent in the process of preparing the mixed liquid, an aggregate may be generated.

In the method of producing a porous cellulose body pertinent to the present embodiment, the solid content concentration of the cellulose nanofibers in the mixed liquid in which water and the organic solvent, and the cellulose nanofibers are mixed, is 0.001 to 5 mass %. The solid content, concentration is more preferably 0.01 to 2 mass %, and particularly preferably 0.05 to 1 mass %. If the solid content concentration of the cellulose nanofibers in the mixed liquid is over 5 mass %, the void between the cellulose nanofibers decreases, and a porous body having a large specific surface area is not obtained. On the other hand, if the solid content concentration of the cellulose nanofibers in the mixed liquid is less than 0.001 mass %, the entanglement of the cellulose nanofibers decreases, and the structure as the porous body cannot be maintained.

In the method of producing the porous body pertinent to the present embodiment, various auxiliaries such as a lyophilization stabilizer and a surface modifier of the cellulose nanofiber may be blended with the mixed liquid. The lyophilization stabilizer is, for example, sucrose, trehalose, L-arginine or L-histidine. In addition, the surface modifier of the cellulose nanofiber is, for example, a cationic surfactant, an anionic surfactant, a non-ionic surfactant or an amphoteric surfactant. Meanwhile, the various auxiliaries are preferably added before the organic solvent is added to the aqueous dispersion of the cellulose nanofibers.

<Lyophilization Process>

In the method of producing the porous body pertinent to the present embodiment, the mixed liquid is lyophilized. The lyophilization is a procedure of freezing the mixed liquid, and decompressing the mixed liquid in the frozen state to sublimate the dispersion medium whereby to dry the dispersion medium. The freezing temperature in the lyophilization should be lower than the freezing point of the dispersion medium in the mixed liquid, and is preferably −50° C. or lower, and more preferably −100° C. or lower. If the freezing temperature is high and eventually the freezing speed is slow, the crystal of the dispersion medium may grow despite the use of the mixed dispersion medium in which water and the organic solvent are mixed, and the cellulose nanofibers may be concentrated around the crystal and the aggregate may be generated. On the other hand, if the freezing temperature is lowered, eventually the freezing speed becomes fast, which makes it possible to freeze the dispersion medium in the state close to amorphous. In the method of producing a porous cellulose body pertinent to the present embodiment, the mixed liquid is lyophilized, and the form of the lyophilized mixed liquid is not limited. A method for lyophilizing the mixed liquid is, for example, a method of lyophilizing the mixed liquid as a simple substance that is contained in a vessel, or a method of lyophilizing the mixed liquid as attached to a porous support such as nonwoven fabric, paper or sponge, together with the support. With the method of lyophilizing the mixed liquid as a simple substance that is contained in a vessel, a thin sheet form or thick plate form of the porous cellulose body is obtained. With the method of lyophilizing the mixed liquid as attached to a porous support, a porous body in which the porous cellulose body is attached to a porous support, is obtained. In the present embodiment, the mixed liquid is in liquid form, and thus it is possible to uniformly attach the mixed liquid to the porous support. A method for attaching the mixed liquid to the porous support is, for example, a method of dipping the whole or a portion of the porous support in the mixed liquid, a method of coating the mixed liquid onto the surface of the porous support, or a method of spraying the mixed liquid onto the surface of the porous support. The adhesion form of the porous cellulose body on the porous support is, for example, a form in which the porous cellulose body is attached only to the surface of the porous support alone, a form in which the porous cellulose body is attached to the surface of the porous support and a portion of the holes of the support, or a form in which the porous cellulose body is attached to the surface of the porous support and the whole of the holes of the support.

In the method of producing the porous body pertinent to the present embodiment, the dispersion medium in the frozen mixed liquid must be sublimated under reduced pressure in the lyophilization. The pressure at the time of the decompression is preferably 200 Pa or less, and more preferably 50 Pa or less. If the pressure is over 200 Pa, the dispersion medium in the frozen mixed liquid may be melt.

EXAMPLES

Next, the present invention will be specifically described with Examples, but the present invention is not limited to these Examples. In addition, "part" and "%" in examples represent "mass part" and "mass %", respectively unless otherwise stated. Meanwhile, the number of the parts added is a value converted to the solid content.

[Preparation Process of Aqueous Dispersion A of Cellulose Nanofibers]

NBKP (those mainly consisting of fibers having a fiber diameter over 1000 nm) equal to 2.00 g by dry weight, 0.025 g of TEMPO (2,2,6,6-tetramethyl piperidine-1-oxy radical) and 0.25 g of sodium bromide were dispersed in 150 ml of water, and then the reaction was initiated by adding sodium hypochlorite so that the amount of sodium hypochlorite was 5.00 mmol with respect to 1.00 g of the pulp (NBKP) using 13% aqueous solution of sodium hypochlorite. During the reaction, 0.50 mol/l aqueous solution of sodium hydroxide was dropped to keep the pH to 10. After 2 hours of the reaction, the reactants were filtered, and sufficiently washed with water to obtain the oxidized cellulose slurry. 0.15 mass % of the oxidized cellulose slurry was fibrillation-treated for 5 minutes at 15000 rotations using Biomixer (BM-2, manufactured by NISSEI Corporation), and further fibrillation-treated for 30 minutes with an ultrasonic dispersing machine (model UA50, manufactured by Kokusai Electric Inc.). Then, removal of coarse fibers was performed by centrifugation, to obtain a transparent aqueous dispersion of the cellulose nanofibers. This dispersion liquid was analyzed from an observation image observed at 50000 folds of the magnification using TEM (JEM2000-EXII, manufactured by JEOL Ltd.), and as a result, the number average fiber diameter was 4 nm. In addition, this dispersion liquid was analyzed from an observation image observed at 10000 folds of the magnification using SEM (S-4000, manufactured by Hitachi, Ltd.), and as a result, the number average fiber length was 1.1 μm. The obtained aqueous dispersion A of the cellulose nanofibers was concentrated with a rotary evaporator to 0.35% of the solid content concentration, which was used in the later processes.

Example 1

Process of Preparing Mixed Liquid

To 28.6 g of the dispersion liquid A of the cellulose nanofibers, 20.4 g of water and 1.0 g of t-butyl alcohol were added, and the vessel was capped, and stirred for 5 minutes with a magnetic stirrer to obtain a mixed, liquid. The solid content concentration of the cellulose nanofibers with respect to the total mass of the mixed liquid was 0.2%. In addition, the mixing rattle of eater and t-butyl alcohol in the mixed liquid by mass ratio was 98:2.

[Lyophilization Process]

The mixed liquid obtained in the process of preparing the mixed liquid was put into an egg-plant shaped flask, and soaked in liquid nitrogen (−196° C.) with rotation. The mixed liquid was completely frozen, and then the dispersion medium was sublimated using a lyophilizing machine (VD-250F, manufactured by TAITEC CORPORATION), to obtain a dried body (porous cellulose body). In addition, the pressure at the time when vacuum was attained, was 50 Pa or less.

Example 2

A dried body (porous cellulose body) was obtained similarly to Example 1 except that 16.4 g of water and 5.0 g of t-butyl alcohol were added to 28.6 g of the dispersion liquid A of the cellulose nanofibers. Herein, the solid content concentration of the cellulose nanofibers with respect to the total mass of the mixed liquid was 0.2%. In addition, the mixing ratio of water and t-butyl alcohol in the mixed liquid by mass ratio was 90:10.

Example 3

A dried body (porous cellulose body) was obtained similarly to Example 1 except that 13.3 g of water and 7.5 g of t-butyl alcohol were added to 28.6 g of the dispersion liquid A of the cellulose nanofibers. Herein, the solid content concentration of the cellulose nanofibers with respect to the total mass of the mixed liquid was 0.2%. In addition, the mixing ratio of water and t-butyl alcohol in the mixed liquid by mass ratio was 85:15.

Example 4

A dried body (porous cellulose body) was obtained similarly to Example 1 except that 11.4 g of water and 10.0 g of t-butyl alcohol were added to 28.6 g of the dispersion liquid A of the cellulose nanofibers. Herein, the solid content concentration of the cellulose nanofibers with respect to the total mass of the mixed liquid was 0.2%. In addition, the mixing ratio of water and t-butyl alcohol in the mixed liquid by mass ratio was 80:20.

Example 5

A dried body (porous cellulose body) was obtained similarly to Example 1 except that 9.0 g of water and 12.5 g of t-butyl alcohol were added to 28.6 g of the dispersion liquid A of the cellulose nanofibers. Herein, the solid content concentration of the cellulose nanofibers with respect to the total mass of the mixed liquid was 0.2%. In addition, the mixing ratio of water and t-butyl alcohol in the mixed liquid by mass ratio was 75:25.

Example 6

A dried body (porous cellulose body) was obtained similarly to Example 1 except that 6.5 g of water and 15.0 g of t-butyl alcohol were added to 28.6 g of the dispersion liquid A of the cellulose nanofibers. Herein, the solid content concentration of the cellulose nanofibers with respect to the total mass of the mixed liquid was 0.2%. In addition, the mixing ratio of water and t-butyl alcohol in the mixed liquid by mass ratio was 70:30.

Example 7

A dried body (porous cellulose body) was obtained similarly to Example 1 except that 1.5 g of water and 20.0 g of t-butyl alcohol were added to 28.6 g of the dispersion liquid A of the cellulose nanofibers. Herein, the solid content concentration of the cellulose nanofibers with respect to the total mass of the mixed liquid was 0.2%. In addition, the mixing ratio of water and t-butyl alcohol in the mixed liquid by mass ratio was 60:40.

Example 8

A dried body (porous cellulose body) was obtained similarly to Example 1 except that 13.9 g of water and 7.5 g of 2-propanol were added to 28.6 g of the dispersion liquid A of the cellulose nanofibers. Herein, the solid content concentration of the cellulose nanofibers with respect to the total mass of the mixed liquid was 0.2%. In addition, the mixing ratio of water and 2-propanol in the mixed liquid by mass ratio was 85:15.

[Process of Preparing Aqueous Dispersion B of Cellulose Nanofibers]

As the aqueous dispersion B of the cellulose nanofibers, an aqueous dispersion in which the cellulose nanofiber was bacteria cellulose (BC), was used. A coconut milk (manufactured by Fujicco, about 1 cm angle) was thinly notched in about 2 mm angle with a utility knife, and the syrup contained in the coconut milk was substituted with water. This was fibrillated for 2 minutes at 10000 rotations using Biomixer (EM-2, manufactured by NISSEI Corporation), and fibrillation-treated for 30 minutes with an ultrasonic dispersing machine (ultrasonic washer, model UA50, manufactured by Hitachi Kokusai Electric Inc.) to obtain an aqueous dispersion of BC. The obtained aqueous dispersion of BC was analyzed from an observation image observed at 50000 folds of the magnification using TEM, and as a result, the number average fiber diameter was 24 nm. The solid content concentration of the cellulose nanofibers in the aqueous dispersion B of the cellulose nanofibers was prepared to 5%.

Example 9

A dried body (porous cellulose body) was obtained similarly to Example 3 except that the aqueous dispersion B of the cellulose nanofibers was used instead of the aqueous dispersion A of the cellulose nanofibers. Herein, the solid content concentration of the cellulose nanofibers with respect to the total mass of the mixed liquid was 0.2%. In addition, the mixing ratio of water and t-butyl alcohol in the mixed liquid by mass ratio was 85:15.

Example 10

A dried body (porous cellulose body) was obtained similarly to Example 1 except that 254.1 g of water and 45 g of t-butyl alcohol were added to 0.86 g of the dispersion liquid A of the cellulose nanofibers. Herein, the solid content concentration of the cellulose nanofibers with respect to the total mass of the mixed liquid was 0.001%. In addition, the mixing ratio of water and t-butyl alcohol in the mixed, liquid by mass ratio was 85:15.

Example 11

A dried body (porous cellulose body) was obtained similarly to Example 1 except that 7.13 g of t-butyl alcohol was added to 42.5 g of the dispersion liquid B of the cellulose nanofibers. Herein, the solid content concentration of the cellulose nanofibers with respect to the total mass of the mixed liquid was 4.28%, In addition, the mixing ratio of water and t-butyl alcohol in the mixed liquid by mass ratio was 85:15.

Comparative Example 1

A dried body was obtained similarly to Example 1 except that 21.4 g of water was added and t-butyl alcohol was not added to 28.6 g of the dispersion liquid A of the cellulose nanofibers. Herein, the solid content concentration of the cellulose nanofibers with respect to the total mass of the mixed liquid was 0.2%. In addition, the mixing ratio of water and the organic solvent in the mixed liquid by mass ratio was 100:0.

Comparative Example 2

To 25.0 g of the aqueous dispersion. A of the cellulose nanofibers concentrated to 0.4% of the solid content concentration, 25.0 g of t-butyl alcohol was added, and as a result, an aggregate was generated and the reaction mixture did not become a uniform mixed liquid, and thus the lyophilization process was net performed. Herein, the solid content concentration of the cellulose nanofibers with respect to the total mass of the mixed liquid was 0.2%. In addition, the mining ratio of water and t-butyl alcohol in the mixed liquid by mass ratio was 50:50.

(Evaluation of Dispersion State)

The dispersion state of the mixed liquid in each Example and each Comparative Example was observed by sight. The evaluation method was as follows.

◯: No generation of aggregate and no change in uniform dispersion state of the cellulose nanofibers even with addition of organic solvent (practical level).

Δ: Aggregate present before addition of organic solvent, and no change in uniform dispersion state of the cellulose nanofibers even with addition of organic solvent (practical level).

x: with addition of organic solvent, aggregate generated, and change caused in dispersion state of dispersion of the cellulose nanofibers (unsuitable for practical level).

(Observation of Dried Body)

Figure 1:
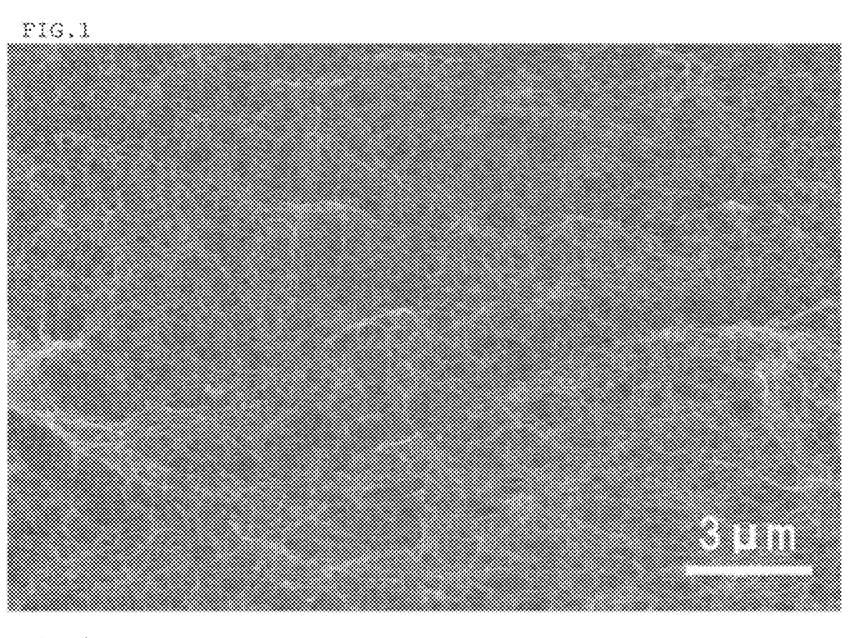
FIG. 1 is a drawing that illustrates an observation image of a porous cellulose body of Example 4 by SEM.
Figure 2:
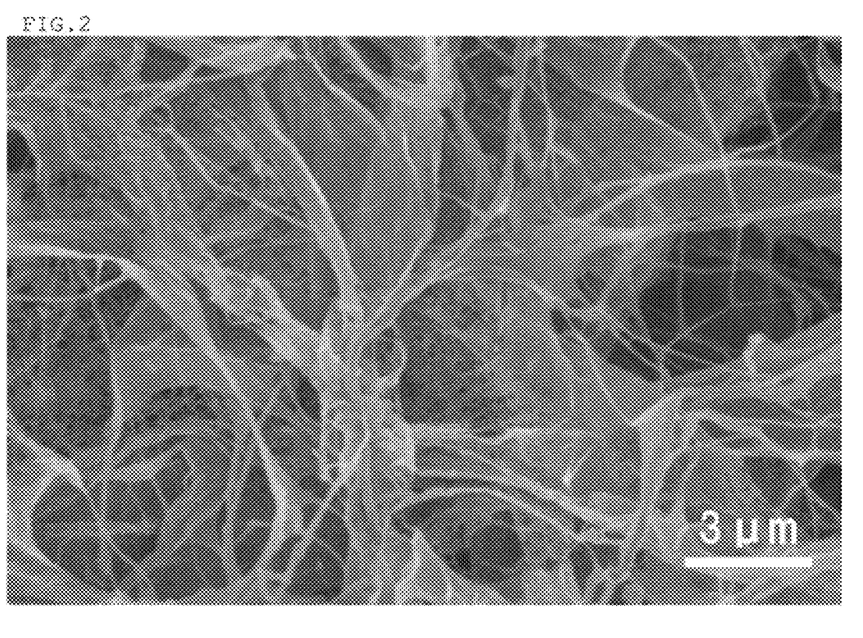
FIG. 2 is a drawing that illustrates an observation image of a dried body of Comparative Example 1 by SEM.

With respect to the dried bodies obtained in each Example and each Comparative Example, the shapes thereof were observed at 5000 folds of the magnification using SEM (S-4000, manufactured by Hitachi, Ltd.). The SEM image of the porous cellulose body obtained in Example 4 was illustrated in FIG. 1, and the SEM image of the dried body obtained in Comparative Example 1 was illustrated in FIG. 2, respectively. It is understood that each one of the cellulose nanofibers in FIG. 1 has an independent-like shape, but the cellulose nanofibers in FIG. 2 aggregate and some of them becomes a membrane, and the porosity between the cellulose nanofibers is lost.

(Measurement of Specific Surface Area)

The specific surface area by the nitrogen adsorption BET method was measured using an automatic apparatus for measuring the specific surface area (TriStar II 3020, manufactured by Micromeritics Instrument Corporation). The measurement results are presented in Table 1.

Example 12

To 28.6 g of the dispersion liquid A of the cellulose nanofibers, 13.9 g of water and 7.5 g of t-butyl alcohol were added, and the vessel was capped, and stirred for 5 minutes with a magnetic stirrer to obtain a mixed liquid. The solid content concentration of the cellulose nanofibers with respect to the total mass of the mixed liquid was 0.2%. In addition, the mixing ratio of water and t-butyl alcohol in the mixed liquid by mass ratio was 85:15. This mixed liquid was attached in 150 g/m$^2$ of the adhesion amount in the wet state to nonwoven fabric consisting of glass fibers having 64 g/m$^2$ of the weight per area and 1.80 m$^2$/g of the specific surface area. This nonwoven fabric was put into liquid nitrogen in the wet state as it was, and frozen. Then, the nonwoven fabric was lyophilized similarly to Example 1, to obtain a porous body in which the porous cellulose bodies are attached to the nonwoven fabric consisting of glass fibers (hereinafter, the porous body is referred to as the porous body X). The specific surface area of the obtained porous body X was 2.85 m$^2$/g. Herein, the mass ratio of the cellulose nanofibers with respect to the nonwoven fabric consisting of glass fibers in the porous body X was 0.47%, and the specific surface area of the porous cellulose body attached to the nonwoven fabric of the porous body X calculated from this ratio was 225 m$^2$/g.

TABLE 1

| | Mixed liquid | | | | | Dried body |
|---|---|---|---|---|---|---|
| | Number average fiber diameter of cellulose nanofibers [nm] | Solid content concentration of cellulose nanofiber in mixed liquid [%] | Kind of organic solvent | Concentration of organic solvent in mixed dispersion medium [%] | Dispersion state | Specific surface area [m$^2$/g] |
| Example 1 | 4 | 0.20 | t-butyl alcohol | 2 | ◯ | 72 |
| Example 2 | 4 | 0.20 | t-butyl alcohol | 10 | ◯ | 179 |
| Example 3 | 4 | 0.20 | t-butyl alcohol | 15 | ◯ | 239 |
| Example 4 | 4 | 0.20 | t-butyl alcohol | 20 | ◯ | 278 |
| Example 5 | 4 | 0.20 | t-butyl alcohol | 25 | ◯ | 324 |
| Example 6 | 4 | 0.20 | t-butyl alcohol | 30 | ◯ | 198 |
| Example 7 | 4 | 0.20 | t-butyl alcohol | 40 | ◯ | 157 |
| Example 8 | 4 | 0.20 | 2-propanol | 15 | ◯ | 115 |
| Example 9 | 24 | 0.20 | t-butyl alcohol | 15 | Δ | 121 |
| Example 10 | 4 | 0.001 | t-butyl alcohol | 15 | ◯ | 285 |
| Example 11 | 24 | 4.28 | t-butyl alcohol | 15 | Δ | 75 |
| Comparative Example 1 | 4 | 0.20 | None | 0 | ◯ | 37 |
| Comparative Example 2 | 4 | 0.20 | t-butyl alcohol | 50 | x | — |

※ "—" in Table represents no data.

The porous cellulose body was obtained in all of Examples 1 to 11. Furthermore, as presented in Table 1, the porous cellulose bodies of Examples 1 to 11 had large specific surface areas of 72 to 324 m$^2$/g. Comparative Example 1 used water alone, and did not use an organic solvent as the dispersion medium, and thus the ice crystal was formed when water as the dispersion medium was frozen, and the cellulose nanofibers aggregated partially. For that reason, a dried body having a small specific surface area was obtained. In Comparative Example 2, the concentration of the organic solvent in the dispersion medium increased, the repulsion possessed by the cellulose nanofibers became weak, and change of the dispersion state was caused. From Example 12, it could be confirmed that it is possible to obtain a porous body in which porous cellulose bodies are attached to a porous support.

As described above, it could be confirmed that according to the method of producing a porous cellulose body pertinent to the present invention, a porous body consisting of cellulose nanofibers having very thin fiber diameters and high hydrophilicity is obtained with a relatively simple method.

INDUSTRIAL APPLICABILITY

The method of producing a porous cellulose body pertinent to the present invention can provide a porous cellulose body consisting of cellulose nanofibers having very thin fiber diameters and high hydrophilicity with low cost. Accordingly, the porous cellulose body pertinent to the present invention can be used suitably in various fields and uses such as a functional filter, an electronic device material, a recycled medical material, and further a carbon material.

What is claimed is:

1. A method of producing a porous cellulose body, the method comprising a process of lyophilizing a mixed liquid containing cellulose nanofibers and a dispersion medium, wherein
the dispersion medium is a mixed dispersion medium of water and an organic solvent dissolving in water,
the concentration of the organic solvent in the mixed dispersion medium is 2 to 40 mass %, and
the solid content concentration of the cellulose nanofibers in the mixed liquid is 0.001 to 5 mass %.

2. The method of producing a porous cellulose body according to claim 1, wherein preparation of the mixed liquid is performed by preparing an aqueous dispersion of the cellulose nanofibers in which the cellulose nanofibers are dispersed in water, and then adding the organic solvent to the aqueous dispersion of the cellulose nanofibers.

3. The method of producing a porous cellulose body according to claim 1, wherein the number average fiber diameter of the cellulose nanofibers is 1 to 100 nm.

4. The method of producing a porous cellulose body according to claim 1, wherein the organic solvent comprises at least one product selected from the group consisting of: alcohols, carboxylic acids and carbonyl compounds.

5. The method of producing a porous cellulose body according to claim 4, wherein the organic solvent comprises at least one product selected from the group consisting of: methanol, ethanol, 2-propanol, t-butyl alcohol as the alcohols, acetic acid as the carboxylic acids and acetone as the carbonyl compounds.

6. The method of producing a porous cellulose body according to claim 1, wherein the organic solvent is t-butyl alcohol alone.

7. A porous cellulose body obtained with the method of producing a porous cellulose body according to claim 1, wherein the specific surface area by a nitrogen adsorption BET method is 70 $m^2/g$ or more.

8. The porous cellulose body according to claim 7, the porous cellulose body being attached to the surface, or the surface and the inside of a porous support.

9. The method of producing a porous cellulose body according to claim 2, wherein the number average fiber diameter of the cellulose nanofibers is 1 to 100 nm.

10. The method of producing a porous cellulose body according to claim 2, wherein the organic solvent comprises at least one product selected from the group consisting of: alcohols, carboxylic acids and carbonyl compounds.

11. The method of producing a porous cellulose body according to claim 10, wherein the organic solvent comprises at least one product selected from the group consisting of: methanol, ethanol, 2-propanol, t-butyl alcohol as the alcohols, acetic acid as the carboxylic acids, and acetone as the carbonyl compounds.

12. The method of producing a porous cellulose body according to claim 3, wherein the organic solvent comprises at least one product selected from the group consisting of: alcohols, carboxylic acids and carbonyl compounds.

13. The method of producing a porous cellulose body according to claim 12, wherein the organic solvent comprises at least one product selected from the group consisting of: methanol, ethanol, 2-propanol, t-butyl alcohol as the alcohols, acetic acid as the carboxylic acids and acetone as the carbonyl compounds.

14. The method of producing a porous cellulose body according to claim 2, wherein the organic solvent is t-butyl alcohol alone.

15. The method of producing a porous cellulose body according to claim 3, wherein the organic solvent is t-butyl alcohol alone.

16. A porous cellulose body obtained with the method of producing a porous cellulose body according to claim 2, wherein
the specific surface area by a nitrogen adsorption BET method is 70 $m^2/g$ or more.

17. The porous cellulose body according to claim 16, the porous cellulose body being attached to the surface, or the surface and the inside of a porous support.

* * * * *